(12) United States Patent
Kim et al.

(10) Patent No.: US 11,082,740 B2
(45) Date of Patent: Aug. 3, 2021

(54) DISPLAY APPARATUS, METHOD OF CONTROLLING THE SAME AND RECORDING MEDIUM THEREOF

(71) Applicant: SAMSUNG ELECTRONICS CO., LTD., Suwon-si (KR)

(72) Inventors: Youngmin Kim, Suwon-si (KR); Youngjoong Noh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 17 days.

(21) Appl. No.: 16/532,803

(22) Filed: Aug. 6, 2019

(65) Prior Publication Data

US 2020/0077141 A1 Mar. 5, 2020

(30) Foreign Application Priority Data

Aug. 30, 2018 (KR) .................. 10-2018-0102599

(51) Int. Cl.
*H04N 21/4363* (2011.01)
*H04N 21/61* (2011.01)
(Continued)

(52) U.S. Cl.
CPC ......... *H04N 21/43637* (2013.01); *H04B 1/02* (2013.01); *H04L 12/2838* (2013.01);
(Continued)

(58) Field of Classification Search
CPC ......... H04N 21/43637; H04N 21/6125; H04N 21/4126; H04N 21/485; H04L 12/2838;
(Continued)

(56) References Cited

U.S. PATENT DOCUMENTS

| 5,631,846 A | 5/1997 | Szurkowski |
| 2005/0163070 A1 | 7/2005 | Farnham et al. |

(Continued)

FOREIGN PATENT DOCUMENTS

| JP | 2012-257048 A | 12/2012 |
| KR | 10-2011-0065220 A | 6/2011 |
| KR | 10-1749737 B1 | 6/2017 |

OTHER PUBLICATIONS

S. Y. Seidel and T. S. Rappaport, "914 MHz path loss prediction models for indoor wireless communications in multifloored buildings," in IEEE Transactions on Antennas and Propagation, vol. 40, No. 2, pp. 207-217, Feb. 1992, doi: 10.1109/8.127405. (Year: 1992).*

(Continued)

*Primary Examiner* — Cynthia M Fogg
(74) *Attorney, Agent, or Firm* — Sughrue Mion, PLLC

(57) ABSTRACT

Disclosed are a display apparatus, a method of controlling the same, and a recording medium thereof, the display apparatus including: a display; a communicator configured to perform wireless communication with at least one device external to the display apparatus; and a processor configured to identify a material of an obstacle present in a vicinity of the display apparatus by obtaining information about the material of the obstacle, and control the communicator to transmit a transmission signal for the wireless communication based on the identified material of the obstacle.

16 Claims, 15 Drawing Sheets

(51) Int. Cl.
*H04L 12/28* (2006.01)
*H04W 52/24* (2009.01)
*H04B 1/02* (2006.01)
*H04B 1/10* (2006.01)
*H04W 52/04* (2009.01)

(52) U.S. Cl.
CPC ........ *H04N 21/6125* (2013.01); *H04W 52/24* (2013.01); *H04B 1/1027* (2013.01); *H04L 2012/2841* (2013.01); *H04W 52/04* (2013.01)

(58) Field of Classification Search
CPC ............ H04L 2012/2841; H04W 4/33; H04W 84/12; H04M 1/0202
USPC ......................................................... 725/115
See application file for complete search history.

(56) References Cited

U.S. PATENT DOCUMENTS

| | | | | |
|---|---|---|---|---|
| 2006/0058062 | A1* | 3/2006 | Bhagwat | H04W 12/1204 455/553.1 |
| 2012/0117502 | A1* | 5/2012 | Nguyen | G06T 7/55 715/769 |
| 2012/0184279 | A1* | 7/2012 | Marti | H04W 4/029 455/446 |
| 2012/0274859 | A1 | 11/2012 | Knutson et al. | |
| 2014/0066124 | A1* | 3/2014 | Novet | H04M 1/72569 455/556.1 |
| 2014/0267558 | A1* | 9/2014 | Verthein | H04L 65/4038 348/14.08 |
| 2015/0208028 | A1 | 7/2015 | Knutson et al. | |
| 2015/0271648 | A1* | 9/2015 | Hsu | H04W 4/029 455/456.1 |
| 2016/0127185 | A1* | 5/2016 | McAllister | H04L 41/0823 370/254 |
| 2017/0010855 | A1* | 1/2017 | Lee | H04R 3/00 |
| 2020/0068413 | A1* | 2/2020 | Hadley | G06T 11/00 |

OTHER PUBLICATIONS

A. Luntovskyy, V. Vasyutynskyy and K. Kabitzsch, "Propagation modeling and placement algorithms for wireless sensor networks," 2010 IEEE International Symposium on Industrial Electronics, Bari, Italy, 2010, pp. 3493-3497, doi: 10.1109/ISIE.2010.5637393. (Year: 2010).*

M. T. Kouakou, K. Yasumoto, S. Yamamoto and M. Ito, "Cost-efficient sensor deployment in indoor space with obstacles," 2012 IEEE International Symposium on a World of Wireless, Mobile and Multimedia Networks (WoWMoM), San Francisco, CA, USA, 2012, pp. 1-9, doi: 10.1109/WoWMoM.2012.6263688. (Year: 2012).*

International Search Report and Written Opinion (PCT/ISA/210 and PCT/ISA/237), dated Dec. 24, 2019 by International Searching Authority in International Application No. PCT/KR2019/010921.

Communication dated Jun. 1, 2021, from the European Patent Office in European Application No. 19856294.4.

\* cited by examiner

DISPLAY APPARATUS, METHOD OF CONTROLLING THE SAME AND RECORDING MEDIUM THEREOF

CROSS-REFERENCE TO RELATED THE APPLICATION

This application is based on and claims priority under 35 U.S.C. § 119 from Korean Patent Application No. 10-2018-0102599 filed on Aug. 30, 2018 in the Korean Intellectual Property Office, the disclosure of which is incorporated by reference herein in its entirety.

BACKGROUND

Field

Apparatuses and methods consistent with the embodiments of the disclosure relate to a display apparatus, a method of controlling the same, and a recording medium thereof, and more particularly to a display apparatus capable of performing wireless communication with an external device, a method of controlling the same, and a recording medium thereof.

Description of the Related Art

With recent development in technology, a television (TV) and the like display apparatuses have been developed to be used for providing various services. To this end, the display apparatus may connect with various external devices by a wire or wirelessly.

When the display apparatus wirelessly connects with the external device, wireless communication is generally set to be performed with a setting value based on standard measurement conditions considering a distance, a obtaining angle, etc., between the display apparatus and the external device.

Although the wireless communication with the external device is set as described above, a signal transmitted from the display apparatus to the external device may be unexpectedly attenuated by presence of an obstacle made of a specific material around the display apparatus based on installation conditions, and thus problems of low speed, disconnection, etc. may arise.

SUMMARY

According to an aspect of the disclosure, there is provided a display apparatus comprising: a display; a communicator configured to perform wireless communication with at least one device external to the display apparatus; and a processor configured to identify a material of an obstacle present in a vicinity of the display apparatus by obtaining information about the material of the obstacle, and control the communicator to transmit a transmission signal for the wireless communication based on the identified material of the obstacle.

The processor may be further configured to: control the display to display a user interface (UI) on the display, and obtain the information about the material of the obstacle present in the vicinity of the display apparatus based on a user's input on the displayed UI.

The processor may be further configured to control the display to display a plurality of candidate obstacles to be selectable on the UI, each of the plurality of candidate obstacles being made of a different material having a corresponding dielectric constant.

The processor may be further configured to: control the display to display a map showing an installation space of the display apparatus, and a plurality of menu items indicating a plurality of candidate obstacles, and control the display to move and place at least one of the plurality of menu items on the map based on a user's input.

The information about the material of the obstacle present in the vicinity of the display apparatus may comprise an image obtained by capturing surroundings of the display apparatus.

The captured image may be obtained from another device external to the display apparatus.

The display apparatus may further comprising at least one sensor, wherein the processor may be further configured to identify whether the obstacle is present in the vicinity of the display apparatus, based on a signal sensed by the at least one sensor.

The processor may be further configured to identify the presence of the obstacle, based on whether the obstacle is present within a predetermined distance from a back side of the display apparatus.

The at least one sensor may be disposed facing downward from an edge of the display.

The display apparatus may further comprise a storage configured to store a setting value of a plurality of transmission signals, each of the plurality of transmission signals corresponding to one of a plurality of candidate obstacles, each of the plurality of candidate obstacles being made of a different material having a corresponding dielectric constant.

The processor may be further configured to read the setting value corresponding to the identified material of the obstacle, and control the communicator to transmit the transmission signal for the wireless communication based on the setting value.

According to another aspect of the disclosure, there is provided a method of controlling a display apparatus, comprising: identifying a material of an obstacle present in a vicinity of the display apparatus by obtaining information about the material of the obstacle; and transmitting a transmission signal for wireless communication with at least one device external to the display apparatus based on the identified material of the obstacle.

The method may further comprise: displaying a user interface (UI) on a display; and obtaining the information about the material of the obstacle present in the vicinity of the display apparatus based on a user's input to the displayed UI.

The method may further comprise displaying a plurality of candidate obstacles, each of the plurality of candidate obstacles being made of a different material having a corresponding dielectric constant.

The method may further comprise: displaying a map showing an installation space of the display apparatus, and a plurality of menu items indicating a plurality of candidate obstacles; and moving and placing at least one of the menu items on the map based on a user's input.

The information about the material of the obstacle present in the vicinity of the display apparatus may comprise an image obtained by capturing surroundings of the display apparatus.

The method may further comprise identifying whether an obstacle is present in the vicinity of the display apparatus, based on a signal sensed by at least one sensor provided in the display apparatus.

The method may further comprise identifying the presence of the obstacle, based on whether the obstacle is present within a predetermined distance from a back or bottom of the display apparatus.

The method may further comprise: reading a setting value corresponding to the identified material of the obstacle from a storage configured to store the setting value of a plurality of transmission signals, each of the plurality of transmission signals corresponding to one of a plurality of candidate obstacles, each of the plurality of candidate obstacles being made of a different material having a corresponding dielectric constant; and transmitting the transmission signal for the wireless communication based on the setting value.

According to another aspect of the disclosure, there is provided a computer-readable nonvolatile recording medium recorded with a program of a method executable by a processor of a display apparatus, the method comprising: identifying a material of an obstacle present in a vicinity of the display apparatus by obtaining information about the material of the obstacle; and transmitting a transmission signal for wireless communication with at least one device external to the display apparatus based on the identified material of the obstacle.

The processor may be further configured to control the communicator to adjust a characteristic of the transmission signal for the wireless communication based on the identified material of the obstacle.

The processor may be further configured to control the communicator to adjust a strength value of the transmission signal for the wireless communication based on the identified material of the obstacle.

The method may further comprise adjusting a characteristic of the transmission signal for the wireless communication based on the identified material of the obstacle.

The method may further comprise adjusting a strength value of the transmission signal for the wireless communication based on the identified material of the obstacle.

According to another aspect of the disclosure, there is provided an electronic apparatus comprising: a communicator configured to perform wireless communication with at least one device external to the electronic apparatus; and a processor configured to: obtain information on an object present in a vicinity between the electronic apparatus and the at least one device, the information including material composition of the object; and control the communicator to wirelessly transmit a signal to the at least one device based on the material composition of the object.

The processor may be further configured to control the communicator to adjust a characteristic of the signal based on the material composition of the object.

The processor may be further configured to control the communicator to adjust a strength value of the signal based on the material composition of the object.

BRIEF DESCRIPTION OF THE DRAWINGS

The above and/or the aspects will become apparent and more readily appreciated from the following description of certain embodiments, taken in conjunction with the accompanying drawings, in which.

DETAILED DESCRIPTION OF EXEMPLARY EMBODIMENTS

Figure 1:
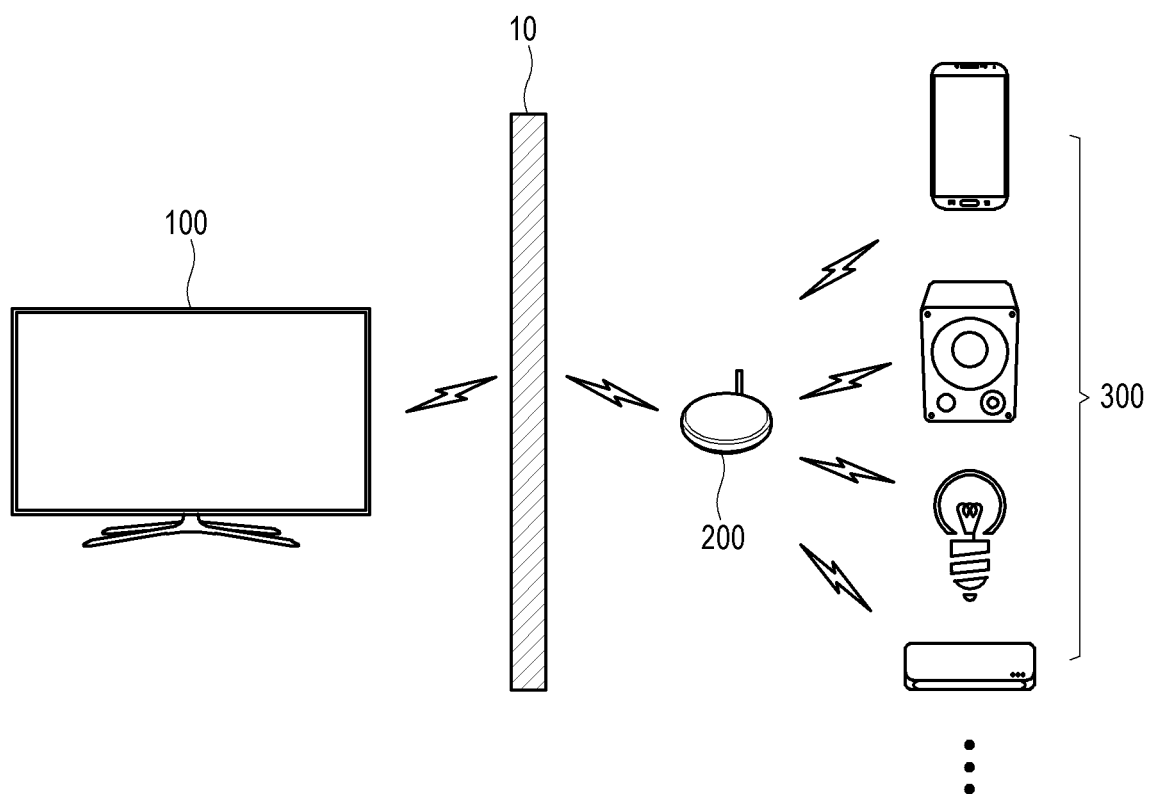
FIG. 1 illustrates a display apparatus installed according to an embodiment of the disclosure.

Below, certain embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following embodiments are not construed as limiting the disclosure and the key configurations and functions. In the following descriptions, details about publicly known functions or features will be omitted if it is identified that they cloud the gist of the disclosure.

In the following embodiments, terms 'first', 'second', etc. are only used to distinguish one element from another, and singular forms are intended to include plural forms unless otherwise mentioned contextually. In the following embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

An aspect of the disclosure is to provide a display apparatus, in which wireless communication is stably performed even though an obstacle is present around the display apparatus, a method of controlling the same, and a recording medium thereof.

Another aspect of the disclosure is to provide a display apparatus, a method of controlling the same, and a recording medium thereof, in which wireless communication is easily set corresponding to presence and a material of an obstacle.

Figure 2:
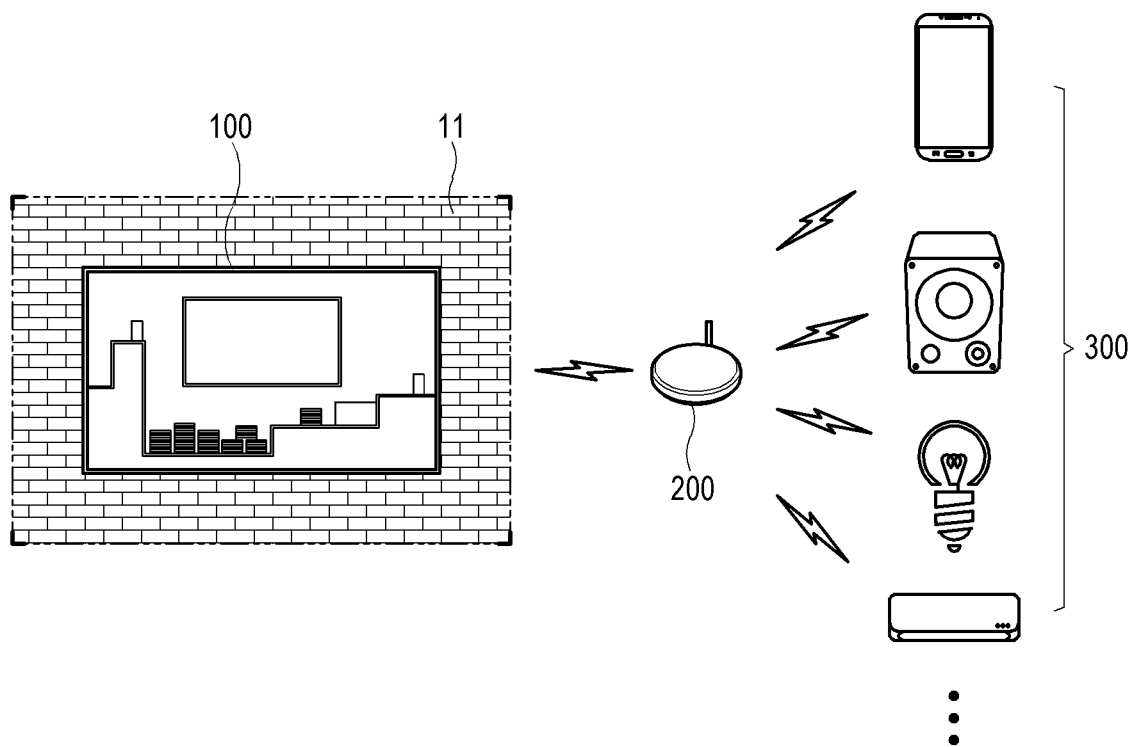
FIG. 2 illustrates a display apparatus installed according to another embodiment of the disclosure.
Figure 3:
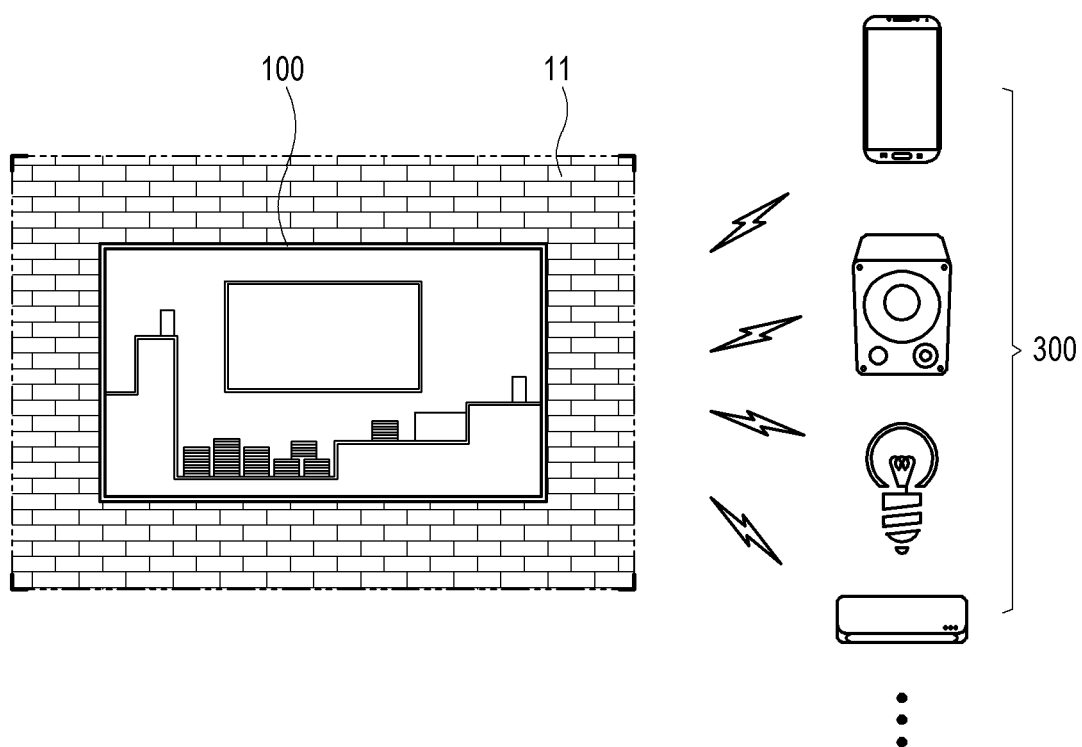
FIG. 3 illustrates a display apparatus installed according to another embodiment of the disclosure.

FIG. 1 illustrates a display apparatus installed according to an embodiment of the disclosure, FIG. 2 illustrates a display apparatus installed according to another embodiment of the disclosure, and FIG. 3 illustrates a display apparatus installed according to another embodiment of the disclosure.

A display apparatus 100 processes an image signal provided from an external image source (not shown) in accordance with an image processing process and displays an image based on the processed image signal. According to an embodiment, the image processing process may be a preset process.

According to the embodiments shown in FIGS. 1 to 3, the display apparatus 100 includes a display apparatus such as a television (TV) for processing a broadcast image based on at least one among a broadcast signal, broadcast information or broadcast data received from a transmitter of a broadcasting station.

The display apparatus 100 may for example wirelessly receive a radio frequency (RF) signal transmitted from the broadcasting station, i.e. a broadcast signal. To this end, the display apparatus 100 may include an antenna to obtain the broadcast signal, and a tuner to be tuned to each individual channel for the broadcast signal. The broadcast signal may be received in the display apparatus through a ground wave, a cable, a satellite, etc. and a signal source in the disclosure is not limited to the broadcasting station. In other words, a set-top box, a player for an optical disc such as a Blu-ray or a digital versatile disc, etc., and the like any apparatus or station capable of transceiving or relaying data may be included in the signal source of the disclosure.

A signal received in the display apparatus 100 may be configured by various methods corresponding to its types, for example, an image signal may be received by wires based on a high definition multimedia interface (HDMI), composite video, component video, super video, syndicat des constructeurs d'appareils radio récepteurs et téléviseurs (SCART), and the like standards. Further, the display apparatus 100 may wirelessly receive an image signal through Wi-Fi, Wi-Fi direct, Bluetooth or the like wireless communication.

Further, the display apparatus 100 may process a signal to display on a screen a moving image, a still image, an application, an on-screen display (OSD), a user interface (UI) for controlling various operations (also referred to as a graphic user interface (GUI), etc. based on a signal/data stored in an internal/external storage medium.

According to an embodiment, the display apparatus 100 may operate as a smart TV or Internet protocol (IP) TV. The smart TV refers to a TV that is capable of obtaining and displaying a broadcast signal in real time, has a web browsing function so that various pieces of content can be searched and consumed through the Internet while the broadcast signal is displayed in real time, and provides a convenient user environment for the web browsing function. Further, the smart TV includes an open-source software platform and thus provides an interactive service to a user. Accordingly, the smart TV may provide a user with various pieces of content, for example, an application for providing a predetermined service through the open-source software platform. Such an application refers to an application program for providing various kinds of service, and may for example include applications for providing services such as social network service, finance, news, weather, a map, music, a movie, a game, an electronic book, etc.

However, the display apparatus 100 of the disclosure is not limited to the TV, and may for example include various apparatuses such as a laptop computer, a desktop computer, or the like personal computer (or a monitor connected to a computer).

The display apparatus 100 according to an embodiment of the disclosure may perform wireless communication with at least one of external devices 200 or 300.

According to an embodiment, the external device includes a relay device 200 (also referred to as a hub apparatus, a gateway or a router) serving as an access point (AP). As shown in FIGS. 1 and 2, the display apparatus 100 wirelessly transmits a control signal to the relay device 200, so that at least one device 300 targeted for control can receive the control signal via the relay device 200.

According to another embodiment, the external device includes at least one device 300 to be subjected to control. As shown in FIG. 3, the display apparatus 100 may wirelessly transmit the control signal to the device 300, which is targeted for control, directly without the relay device 200.

As shown in FIGS. 1 to 3, at least one device 300 may include a loudspeaker configured to output a sound, an illumination device, a home appliance such as an air conditioner, etc.

The external device 300 according to the disclosure, which can perform wireless communication with the display apparatus 100 via the relay device 200 or directly, is not limited to those shown in FIGS. 1 to 3, but may include a set-top box (STB); a PC such as a laptop computer or a desktop computer; a mobile device (or a user terminal) such as a cellular phone, a smartphone, a tablet or the like smart pad, etc.; a wearable device such as a smart watch, 3D glasses, a virtual reality (VR) device or the like head mountable display; a player for a Blu-ray disc, a digital versatile disc (DVD), or the like optical disc; a content provider (or an image source) such as an audio/video receiver; a game console; home appliance devices, and other electronic devices capable of performing communication using a wireless network.

According to an embodiment, the device 300, which can perform wireless communication with the display apparatus 100 via the relay device 200 or directly, further includes a remote controller or the like input device.

The display apparatus 100 performing wireless communication with the external device 200 or 300 as described above needs to adjust strength of a transmission signal for the wireless communication with the external device 200 or 300 according to installation conditions. Here, the installation conditions include presence of an obstacle placed around the display apparatus 100 and/or the material of the obstacle. According to an embodiment, the obstacle may be placed in a vicinity of the display apparatus. According to another embodiment, the obstacle may be placed in the vicinity of the display apparatus directly and fully between display apparatus and the external device 200 or 300. According to another embodiment, the obstacle may be placed in the vicinity of the display apparatus partially covering an area between display apparatus and the external device 200 or 300.

The display apparatus 100 actualized as a TV according to an embodiment of the disclosure may be installed in the form of a stand type (or a desk type) installed on a floor or a table, or a wall-mount type hung on a wall.

As shown in FIGS. 1 to 3, the display apparatus 100 may be installed in surroundings where the obstacles 10 and 11 are present. Here, the obstacle 10 may include a wall present inside/outside a room of a house, an office, etc.

As shown in FIG. 1, when a wall or the like obstacle is present between the display apparatus 100 and the external device, i.e., the relay device 200, a wireless signal may be transmitted from the display apparatus 100 to the relay device 200 while at least partially passing through the obstacle 10.

Although FIG. 1 illustrates an example that the wireless signal is transmitted from the display apparatus 100 to the relay device 200, the display apparatus 100 of the disclosure may perform the wireless communication with the device 300, which is targeted for control, directly without the relay device 200. Under the installation conditions where the obstacle 10 is present as shown in FIG. 1, the wireless signal transmitted from the display apparatus 100 may at least partially penetrate the obstacle 10 and reach at least one device 300.

As shown in FIGS. 2 and 3, when the display apparatus 100 is installed in the form of the wall-mount type to be hung on a wall 11, the wireless signal transmitted from the display apparatus 100 to the external device, i.e., the relay device 200 or the device 300 targeted for control may at least partially transmitting through the wall 11 and reach the relay device 200 or the corresponding device 300.

The transmission coefficient of the wireless signal may vary depending on the material of the obstacle 10 or 11 targeted for transmission, and examples of the transmission coefficient are tabulated in the following table 1.

TABLE 1

Size: A * B * C
Transmission Coefficient [Db]

| | | |
|---|---|---|
| Concrete | | |
| 2.45 GHz | | x |
| 5 GHz | | y |
| | Brick | |
| 2.45 GHz | | x' |
| 5 GHz | | y' |
| | Wood | |
| 2.45 GHz | | x'' |
| 5 GHz | | y'' |
| | Glass | |
| 2.45 GHz | | x''' |
| 5 GHz | | y''' |

As described above, when the obstacle 10 or 11 is present around the display apparatus 100, the signal is attenuated during the wireless communication between the display apparatus 100 and the external device 200 or 300, and thus problems of low speed, disconnection, etc. may arise. Further, a degree of signal attenuation may vary depending on the material of the obstacle 10 or 11.

To solve such problems, the display apparatus 100 according to an embodiment of the disclosure adjusts strength of a transmission signal for the wireless communication with the external device 200 or 300 based on the installation conditions, thereby stably performing the wireless communication regardless of surrounding obstacles.

Below, the elements of the display apparatus according to an embodiment of the disclosure will be described with reference to the accompanying drawings.

Figure 4:
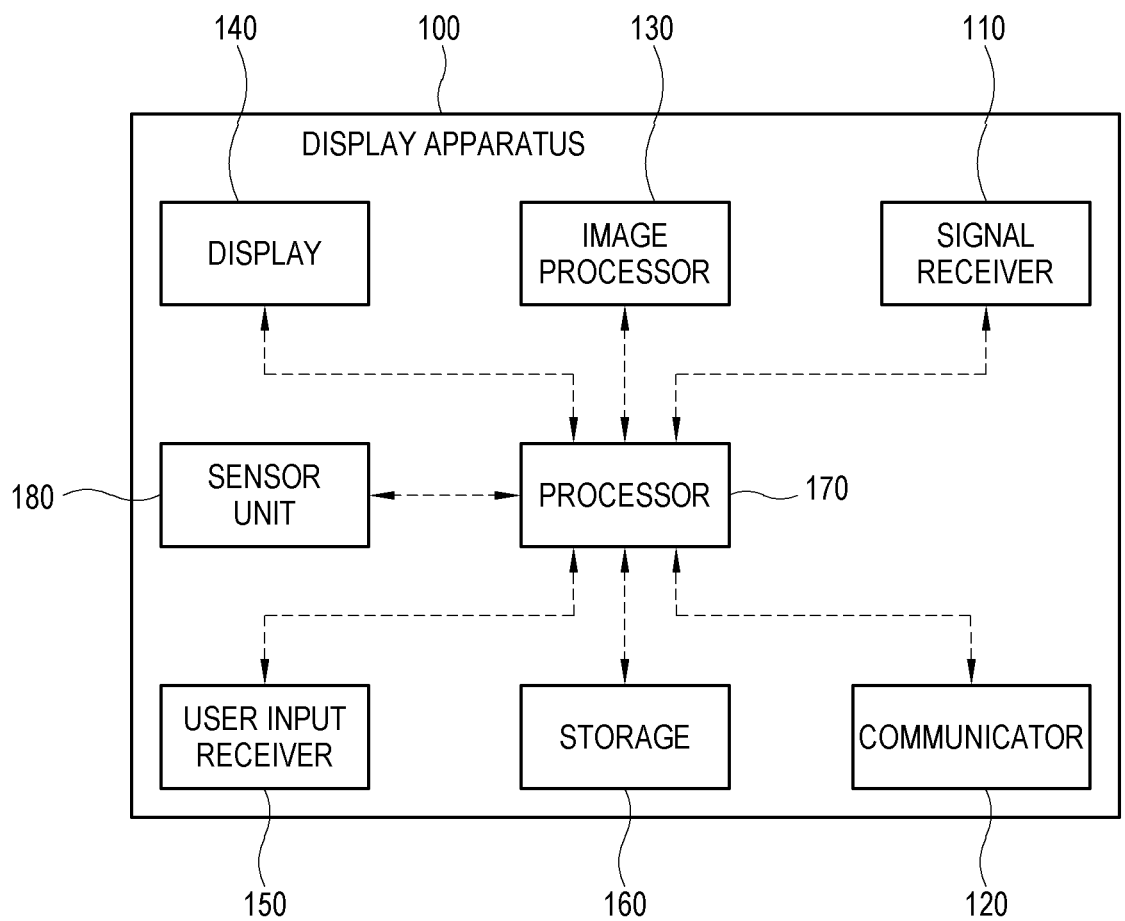
FIG. 4 is a block diagram of a display apparatus according to an embodiment of the disclosure.

FIG. 4 is a block diagram of a display apparatus according to an embodiment of the disclosure.

The display apparatus 100 according to an embodiment of the disclosure includes a signal receiver 110, a communicator 120, an image processor 130, a display 140, a user input receiver 150, a storage 160, and a processor 170. The display apparatus 100 may additionally be provided with a sensor unit 180 including at least one sensor.

The signal receiver 110 may obtain an image signal (i.e. content) from the outside and transmit it to the image processor 130. The standards of the received signal may be variously achieved corresponding to the types of the display apparatus 100. For example, the signal receiver 110 may wirelessly receive an RF signal from a broadcasting station (not shown), or may obtain an image signal by a cable according to the standards such as composite video, component video, super video, SCART, HDMI, etc. The signal receiver 110 may be actualized by a communication circuitry including a data input/output interface where ports and communication modules (e.g. an S/W module, a chip, etc.) corresponding to various kinds of communication protocols are combined.

According to an embodiment, the signal receiver 110 may include a tuner to be tuned to a channel for a broadcast signal when an image signal is the broadcast signal. Further, the image signal may be obtained from various peripheral apparatuses. Further, the image signal may be based on data received through the Internet or the like network. In this case, the display apparatus 100 may obtain the image signal through the communicator 120 (to be described later).

Further, the image signal may be based on data stored in the nonvolatile storage 160 such as a flash memory, an HDD, etc. The storage 160 may be provided inside or outside the display apparatus 100. When the storage 160 is provided outside the display apparatus 100, a connector (not shown) may be provided to connect with the storage 160.

The communicator 120 is configured to communicate with at least one external device 200 or 300 by a wired or wireless communication method. The communicator 120 may be actualized by a communication circuitry including communication modules (e.g. an S/W module, a chip, etc.) corresponding to various kinds of communication protocols.

According to an embodiment, the communicator 120 includes a wireless local area network (WLAN) unit. The WLAN unit wirelessly transmits a signal to the AP, i.e. the relay device 200 under control of the processor 170, so that at least one device 300 targeted for control can obtain the corresponding signal through the relay device 200. The WLAN unit includes a Wi-Fi communication module.

According to an embodiment, the communicator 120 includes at least one of local area communication modules such as Bluetooth, Bluetooth low energy, RF communication, Wi-Fi Direct, ZigBee, ultra wideband (UWB), near field communication (NFC), infrared data association (IrDA), etc. The local area communication module may be configured to support direct communication between the display apparatus 100 and at least one device 300 without the AP wirelessly.

According to an embodiment, the communicator 120 may further include Ethernet or the like wired communication module.

The communicator 120 of the display apparatus 100 according to an embodiment of the disclosure may be actualized by one among the WLAN unit, the local area communication module, and the wired communication module, or combination of more than two of them.

According to an embodiment, the display apparatus 100 performs the wireless communication with at least one of external devices 200 and 300 through the communicator 120. When the display apparatus 100 performs direct wireless communication with at least one device 300, the storage 160 may be configured to store identification information, such as a media access control (MAC) address or an IP address, about the device 300 targeted for communication.

The image processor 130 performs various image or sound processing processes with regard to the image signal obtained from the signal receiver 110. The image processor 130 outputs a signal generated or combined by performing such image processing processes to the display 140, so that an image based on an image signal can be displayed on the display 140.

The image processor 130 includes a decoder configured to decode an image signal to correspond to an image format of the display apparatus 100, and a scaler configured to adjust the image signal to an output resolution of the display 140. The decoder in this embodiment may for example be actualized by a moving picture experts group (MPEG) decoder. Here, there are no limits to the kind of image processing processes performed by the image processor 130 of the disclosure. For example, the image processor 130 of the disclosure may perform at least one of various processes such as de-interlacing for converting an interlaced-type broadcast signal into a progressive-type broadcast signal, noise reduction for improving image quality, detail enhancement, frame refresh rate conversion, and line scanning.

The image processor 130 may be actualized by a group of individual elements for independently performing such processes, or may be actualized as included in a main system-on-chip (SoC) where many functions are integrated. The main SoC may include at least one micro-processor or central processing unit (CPU) as an example of the processor 170 (to be described later).

According to an embodiment, the image processor 130 may be actualized by a video board where various chipsets, a memory, electronic parts, wiring lines, and the like circuit components for performing such processes are mounted on to a printed circuit board (PCB). In this case, the signal receiver 110, the image processor 130 and the processor 170 of the display apparatus 100 may be provided in a single video board. Of course, this is merely an example, and alternatively the image processor 130 and the processor 170 may be arranged in a plurality of printed circuit boards connectable with each other.

The image signal processed by the image processor 130 is output to the display 140. The display 140 displays an image based on the image signal obtained from the image processor 130.

The display 140 may for example be variously actualized by liquid crystal, plasma, a light emitting diode, an organic light emitting diode, a surface-conduction electron-emitter, a carbon nano-tube, nano-crystal, or the like display type without limitations. According to an embodiment, the display 140 includes a display panel configured to display an image, and may further include an additional element (driver) according to its type.

In the display apparatus 100 according to an embodiment of the disclosure, the display 140 displays at least one UI though which the material of the obstacle 10 or 11 may for example be selectable as the installation condition of the display apparatus 100. A user may use the user input receiver 150 to make a user input through the UI displayed.

The processor 170 may receive information about the material of the obstacle 10 or 11 positioned around the display apparatus 100 based on the user input to the UI displayed as above. In other words, the wireless communication corresponding to the installation condition is set by a user's simple control, and it is convenient for a user.

The user input receiver 150 transmits to the processor 170 various control commands or unrestricted information based on a user's input. According to an embodiment, the control commands may be preset control commands.

The user input receiver 150 includes a keypad (or input panel) including a power key, a numeral key, a menu key, and the like buttons provided in a main body of the display apparatus 100.

According to an embodiment, the user input receiver 150 includes an input device that generates at least one of a command, data, information or a signal for remotely controlling the display apparatus 100 and transmits it to the display apparatus 100. According to an embodiment, the at least one of a command, data, information or a signal may be preset. The input device includes a remote controller, a keyboard, a mouse, etc. provided separately from the main body of the display apparatus 100 and capable of obtaining a user's input.

The remote controller may include a touch sensor unit for detecting a user's touch input and/or a motion sensor unit for detecting its own motion caused by a user. The input device includes a terminal such as a smart phone where a remote controller application is installed, and in this case a user's touch input can be made through a touch screen.

The input device is included in an external device that performs wireless communication with the display apparatus 100, and the wireless communication includes Wi-Fi, Bluetooth, infrared communication, RF communication, WLAN, Wi-Fi direct, etc.

According to an embodiment, the user input receiver 150 may further include a sound receiver for obtaining a voice/sound uttered by a user. The sound receiver may be actualized by a microphone for obtaining a sound signal.

The storage 160 may be configured to store various pieces of data of the display apparatus 100. The storage 160 may be actualized by a nonvolatile memory (or a writable memory) which can retain data even though the display apparatus 100 is powered off, and mirror changes. The storage 160 may be provided as one among an HDD, a flash memory, electrically programmable ROM (EPROM) or electrically erasable and programmable ROM (EEPROM).

The storage 160 further includes a RAM or the like volatile memory, and the volatile memory may be provided as a dynamic RAM (DRAM) or static RAM (SRAM), of which reading or writing speed is faster than that of a nonvolatile memory. That is, a term 'storage' in this disclosure is defined to involve not only a nonvolatile memory, but also a volatile memory, a cache memory provided inside the processor 170, and a memory card (e.g. a micro secure digital (SD) card, a memory stick, etc.) mountable to the display apparatus 100 through a connector.

Data stored in the storage 160 may for example include not only an operating system (OS) for driving the display apparatus 100 but also various applications, image data, appended data, etc. executable on the OS.

Specifically, the storage 160 may be configured to store a signal or data input/output corresponding to operation of each element under control of the processor 170. The storage 160 may be configured to store a program for controlling the display apparatus 100, a UI related to an application downloaded from the outside or provided by a manufacturer, images for providing the UI, user information, documents, databases, or related data.

According to an embodiment, the storage 160 may be configured to store setting values for wireless communication identified based on the installation conditions of the display apparatus 100. Here, the setting value for the wireless communication may be stored in the storage 160 with a matching material of the obstacle present around the display apparatus 100, as strength of a signal transmitted from the display apparatus 100 through the communicator 120.

As an example of storing the setting value for the wireless communication as described above, the storage 160 may be configured to store setting values for a transmission signal corresponding to a plurality of candidate obstacles made of materials different in dielectric constant. According to an embodiment, the plurality of candidate obstacles may be made of preset materials.

The processor 170 performs control to operate general elements of the display apparatus 100. The processor 170 includes at least one universal processor that loads at least a part of a control program from a nonvolatile memory, in which the control program is installed, to a volatile memory, and executes the loaded control program, and may for example be actualized by a CPU, an application processor (AP), or a microprocessor.

The processor 170 may include a single core, a dual core, a triple core, a quad core, and the like multiple core. The processor 170 may include a plurality of processors, for example, a main processor and a sub processor that operates in a sleep mode (during which only standby power is supplied without operation of the display apparatus). Further, the processor, the ROM, and the RAM may be connected to one another through an internal bus.

According to an embodiment, the processor 170 may include a graphic processing unit (GPU) for graphic processing, and the processor may for example be actualized in the form of an SoC where the core and the GPU are combined.

In the disclosure, the processor 170 may be actualized as included in the main SoC mounted to the PCB internally provided in the display apparatus 100. Alternatively, the main SoC may further include the image processor 120 for processing an image signal.

The control program may include a program(s) achieved by at least one of a basic input/output system (BIOS), a device driver, an OS, a firmware, a platform, or an application. According to an exemplary embodiment, the application may be previously installed or stored in the display apparatus 100 when the display apparatus 100 is manufactured, or may be installed in the display apparatus 100 on the basis of application data received from the outside when it is required in the future. The application data may for example be downloaded from an external server such as an application market to the display apparatus 100. Such an external server is merely an example of the computer program product according to the disclosure, but not limited thereto.

According to an embodiment, the processor 170 identifies a material of an obstacle by receiving information about the material of the obstacle positioned around the display apparatus 100, and controls the communicator 120 to adjust strength of a transmission signal for wireless communication based on the identified material of the obstacle.

Here, the processor 170 may display the UI on the display 140, and receive information about the material of the obstacle positioned around the display apparatus 100 based on a user's input onto the displayed UI. Further, the information related to the material of the obstacle positioned around the display apparatus 100 may include an information obtained by capturing the surroundings of the display apparatus 100.

According to another, the processor 170 may identify whether an obstacle is present around the display apparatus 100.

Here, the processor 170 may display the UI on the display 140, and identify the presence of the obstacle positioned around the display apparatus 100 based on a user's input onto the displayed UI. Further, the processor 170 may identify the presence of the obstacle positioned around the display apparatus 100 based on a signal detected by at least one sensor provided in the display apparatus 100. Further, the processor 170 may identify the presence of the obstacle positioned around the display apparatus 100 based on an image obtained by capturing the surroundings of the display apparatus 100.

According to an embodiment, the foregoing operation of the processor 170 may be actualized by a computer program stored in the computer program product (not shown) provided separately from the display apparatus 100.

In this case, the computer program product includes a memory in which an instruction corresponding to a computer program is stored, and a processor. The instruction may be issued to identify the material of the obstacle by receiving information about the material of the obstacle positioned around the display apparatus 100, and adjust the strength of the transmission signal for the wireless communication based on the identified material of the obstacle when the instruction is executed by the processor. Accordingly, the display apparatus 100 downloads and executes the computer program stored in a separate computer program product and performs the operation of the processor 170.

Further, according to an embodiment, the operation of the processor 170 may be actualized by a program stored in a recording medium and readable by a computer. The program, i.e. data stored in the recording medium may be executed as directly accessed by the processor 170, or may be executed as downloaded to the display apparatus 100 through a transfer medium actualized by a wired/wireless network where computer systems are linked.

The sensor unit 180 includes at least one sensor installed in the main body of the display apparatus 100. The sensor unit 180 may for example include at least one among an infrared (IR) sensor, an ultrasonic sensor, and an illuminance sensor. However, the sensor unit 180 is not limited to the sensors or the types of sensors provided in the example above. Also, the sensor unit 180 may include a single sensor or a plurality of sensors.

According to an embodiment, the sensor included in the sensor unit 180 may be installed on the rear of the display apparatus 100, or may be installed downward from the edge of the display panel. However, this is merely an example, and does not limit the installation position of the sensor.

The sensor unit 180 outputs a signal corresponding to a detection result of the sensor to the processor 170. Based on the detection results of the sensor unit 180, the processor 170 can identify the presence of the surrounding obstacle as the installation condition of the display apparatus 100.

According to another embodiment, an electronic apparatus may have a communicator that performs wireless communication with at least one device external and a processor that obtains information on an object present in a vicinity between the electronic apparatus and the at least one device and controls the communicator to wirelessly transmit a signal to the at least one device based on the obtained information. According to an embodiment, the information may include information on material composition of the object and the processor may control the communicator to wirelessly transmit a signal to the at least one device based on the material composition of the object.

According to an embodiment, the processor of the electronic apparatus may control the communicator to adjust a characteristic of the transmission signal for the wireless communication based on the identified material of the object. The characteristic information of the transmission signal may be a strength value of the transmission signal for the wireless communication based on the identified material of the object.

Below, a method of setting wireless communication in the display apparatus 100 according to an embodiment of the disclosure will be described.

Figure 5:
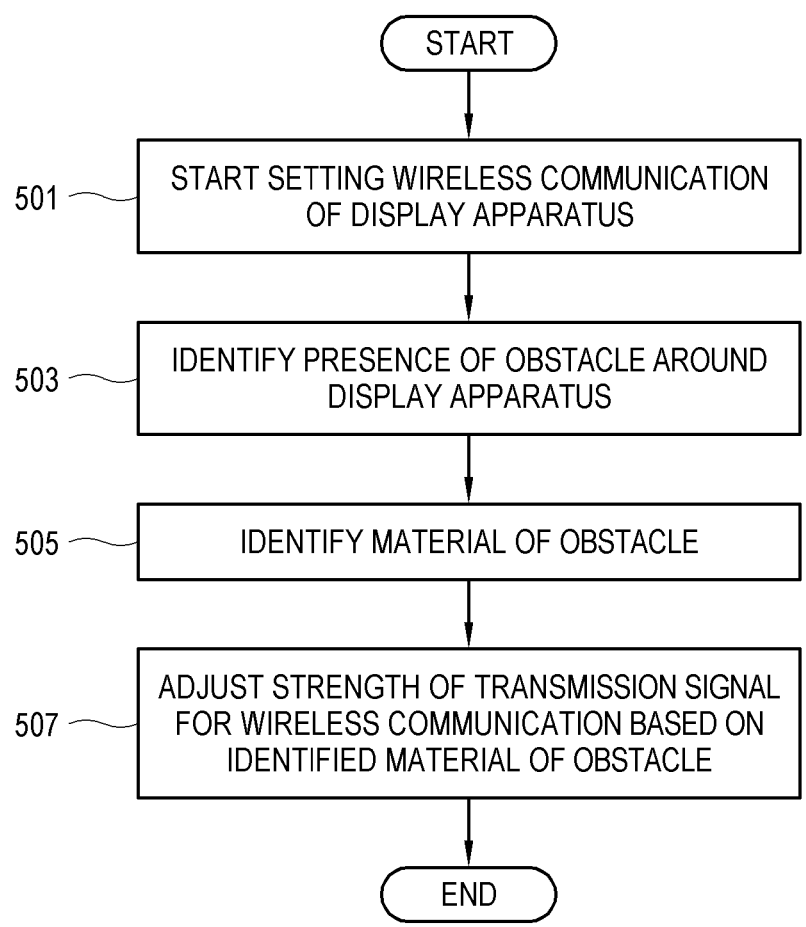
FIG. 5 is a flowchart showing a method of controlling a display apparatus according to an embodiment of the disclosure.

FIG. 5 is a flowchart showing a method of controlling a display apparatus according to an embodiment of the disclosure.

As shown in FIG. 5, the processor 170 starts setting the wireless communication of the display apparatus 100(501). Here, the processor 170 may start setting the wireless communication for the communicator 120 in at least one among a case where the display apparatus 100 is installed for the first time, a case where it is detected that wireless communication speed is lowered in the previously installed display apparatus 100, or a case where a predetermined event including a user's input occurs.

When the setting of the wireless communication starts in the operation 501, the processor 170 identifies whether an obstacle is present around the display apparatus 100 (503). Here, the obstacle may include a wall present inside/outside a room of a house, an office, etc.

In the operation 503, the processor 170 may display the UI on the display 140, and identify the presence of the obstacle based on a user's input onto the displayed UI.

Figure 6:
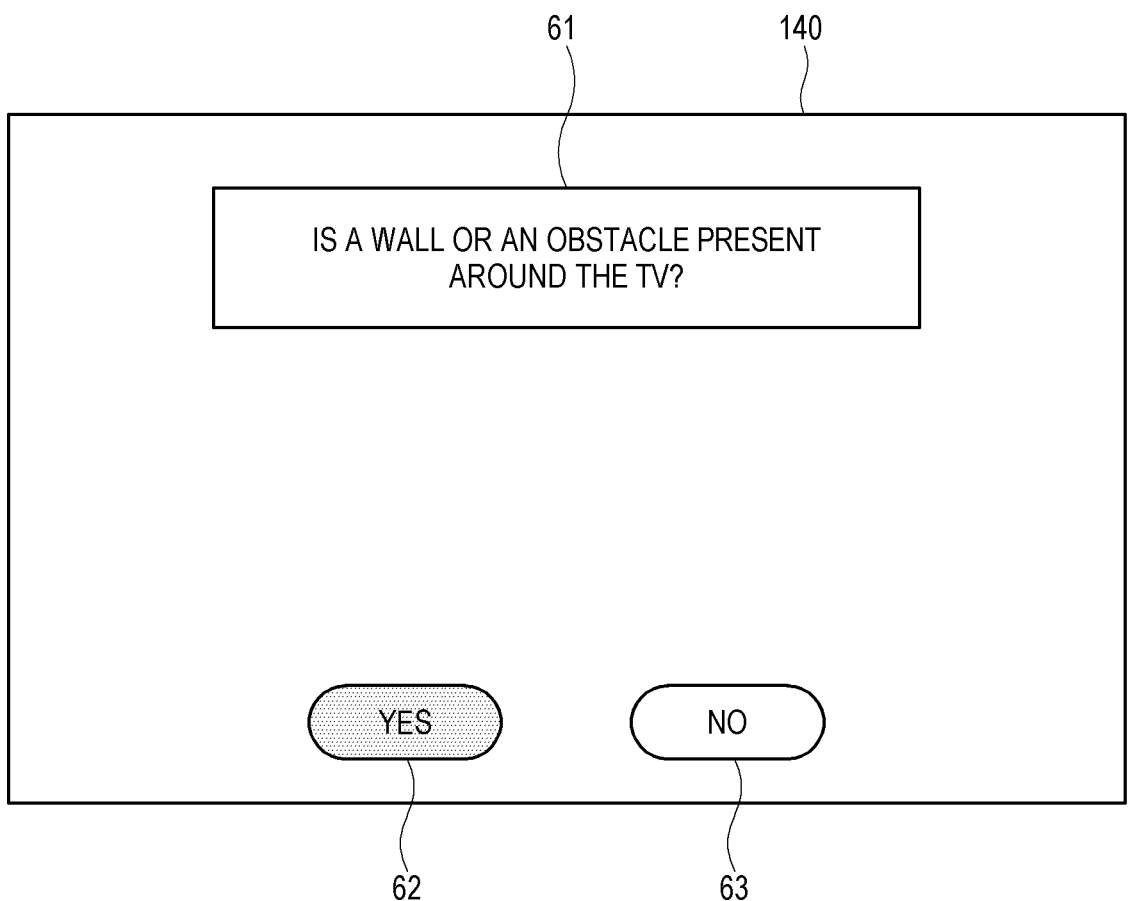
FIGS. 6 to 8 illustrate user interfaces (UIs) displayed on a display according to an embodiment of the disclosure.
Figure 7:
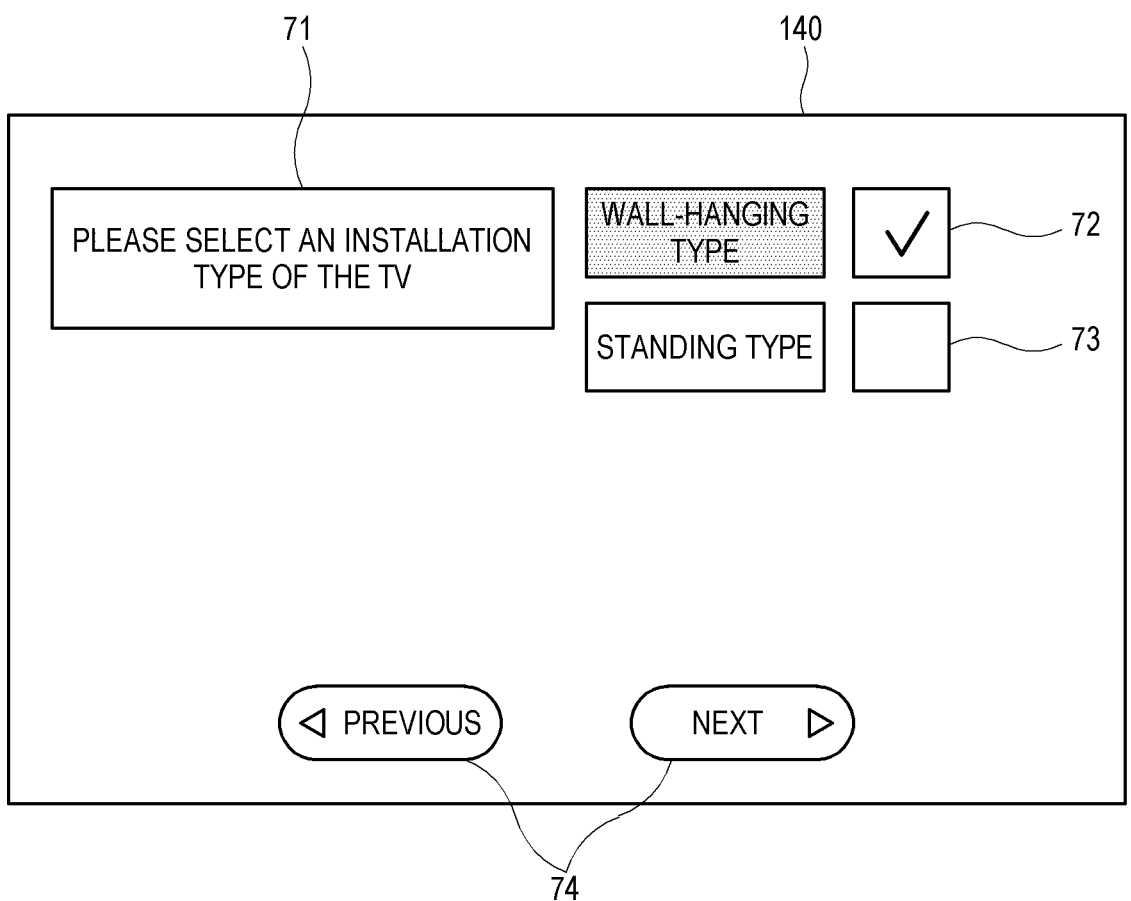
Figure 8:
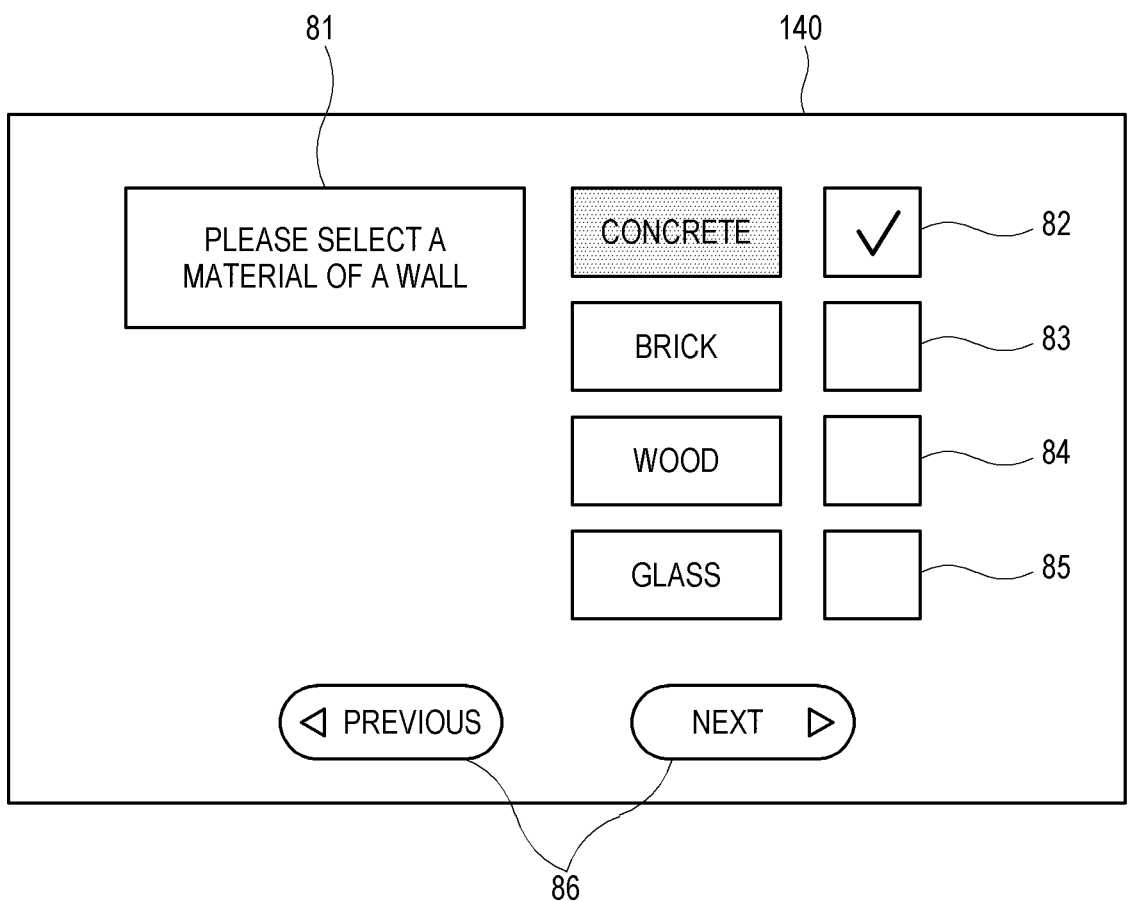

FIGS. 6 to 8 illustrates UIs displayed on a display according to an embodiment of the disclosure.

As shown in FIG. 6, the display 140 may display a UI including a message 61 for checking whether an obstacle is present in surroundings where the display apparatus 100, i.e. the TV is installed, and at least one item (or button) 62, 63 allowing a user to make selection in response to the message 61.

In the UI of FIG. 6, when a user makes a user input for selecting the item 62 of 'YES', the processor 170 identifies that an obstacle is present around the display apparatus 100.

Alternatively, as shown in FIG. 7, the display 140 may display a UI including a message 71 for checking an installation type of the display apparatus 100, i.e. the TV, and at least one menu item 72, 73 allowing a user to make selection in response to the message 72. FIG. 7 illustrates an example that the menu items 72 and 73, by which a user's selection about the installation type of the display apparatus 100 is input, are displayed in the form of check boxes.

Further, the UI may further include at least one item 74 allowing a user to make selection for entering the next stage or returning to the previous stage.

As shown in FIG. 7, a user may select one of wall-hanging and standing as the installation type of the display apparatus 100. In the UI of FIG. 7, when a user makes a user input for selecting the item 72 of 'WALL-HANGING', the processor 170 identifies that an obstacle is present around the display apparatus 100.

In other words, when the display apparatus 100 of the wall-hanging type is installed in as shown in FIG. 2 or 3, the wireless signal at least partially transmits the wall 11 and is then delivered to the external device, i.e. the relay device 200 or the corresponding device 300. This means that the obstacle is present in the surroundings.

A user may select the item 74 of 'NEXT' in the UI of FIG. 7 so that the processor 170 can enter the next stage for setting the wireless communication.

When it is identified in the operation 503 that an obstacle is present around the display apparatus 100, the processor 170 identifies the material of the obstacle (505). Here, the processor 170 may identify the material of the obstacle by obtaining information about the material of the obstacle positioned around the display apparatus 100. The information about the material of the obstacle positioned around the display apparatus 100 may for example be obtained based on a user's input. Alternatively, the information about the material of the obstacle positioned around the display apparatus 100 may include an image obtained by capturing the surroundings of the display apparatus 100.

Specifically, in the operation 505, the processor 170 may display the UI on the display 140, and identify the material of the obstacle based on a user's input to the displayed UI.

According to an embodiment, as shown in FIG. 8, the display 140 may display a UI including a message 81 for identifying a material of an obstacle present around of the display apparatus 100, i.e. the TV, and at least one menu item 82, 83, 84, 85 allowing a user to make selection in response to the message 72. FIG. 8 illustrates an example that the menu items 82, 83, 84 and 85 are displayed in the form of check boxes.

Here, the menu items 82, 83, 84 and 85 displayed for selection correspond to a plurality of candidate obstacles made of materials different in dielectric constant.

Further, the UI may further include at least one item 86 allowing a user to make selection for entering the next stage or returning to the previous stage.

In FIG. 8, concrete, brick, wood and glass are illustrated as examples of the selectable materials of the candidate obstacle. However, the material of the obstacle is not limited to the foregoing examples, and various materials are possible. Therefore, the UI may additionally include menu items as well as the menu items 82, 83, 84 and 85 shown in FIG. 8. Further, the UI allowing a user to check the material of the obstacle is not limited to the form shown in FIG. 8.

The processor 170 adjusts the strength of the transmission signal for the wireless communication, based on the material of the obstacle identified in the operation 505 (507).

Specifically, the processor 170 may identify whether the material of the obstacle corresponds to one among the plurality of materials different in dielectric constant, based on the identification in the operation 505. The processor 170 identifies the strength of the transmission signal corresponding to the identified material of the obstacle, and controls the communicator 120 to adjust the strength of the transmission signal for the wireless communication based on the identification.

According to an embodiment, the storage 160 is configured to store a setting value indicating the strength of the transmission signal corresponding to the plurality of candidate obstacles made of materials different in dielectric constant. The processor 170 reads the setting value corresponding to the identified material of the obstacle from the storage 160, and performs control to adjust the strength of the transmission signal for the wireless communication based on the read setting value. That is, the processor 170 sets the strength of the transmission signal with the setting value read from the storage 160.

Here, the setting value indicating the strength of the transmission signal matching the material of the obstacle is identified based on a signal attenuation rate at a frequency according to the materials. Examples of the signal attenuation rate according to the obstacles, i.e. media are as shown in the following table 2.

TABLE 2

| Material | Thickness | Dielectric constant | Signal attenuation rate |
|---|---|---|---|
| Concrete | A | 6.25 | 6.25 * A * equation1 |
| Brick | A | 4.4 | 4.4 * A * equation1 |

TABLE 2-continued

| Material | Thickness | Dielectric constant | Signal attenuation rate |
|---|---|---|---|
| Wood | A | 2 | 2 * A * equation1 |
| Glass | A | 5.1 | 5.1 * A * equation1 |

As shown in Table 2, the signal attenuation rate corresponding to each material of the obstacle corresponds to the dielectric constant of the medium (i.e. the obstacle). That is, the signal attenuation rate becomes higher as the dielectric constant increases. In Table. 2, concrete has the highest signal attenuation rate.

According to an embodiment, the processor 170 controls the strength of the transmission signal for the wireless communication to be amplified larger as the dielectric constant or the signal attenuation rate of the identified obstacle becomes higher. Therefore, when the obstacle is made of concrete, the strength of the transmission signal is amplified larger than the strength of the transmission signal of the obstacles made of other materials.

In other words, the transmission signal is amplified larger with regard to an obstacle having a higher signal attenuation rate corresponding to a dielectric constant, and therefore the wireless communication is stable regardless of the kind of obstacle.

As described above, an embodiment of identifying presence of an obstacle and the material of the obstacle through the UI displayed on the display 140 may be actualized differently from those shown in FIGS. 6 to 8.

Figure 9:
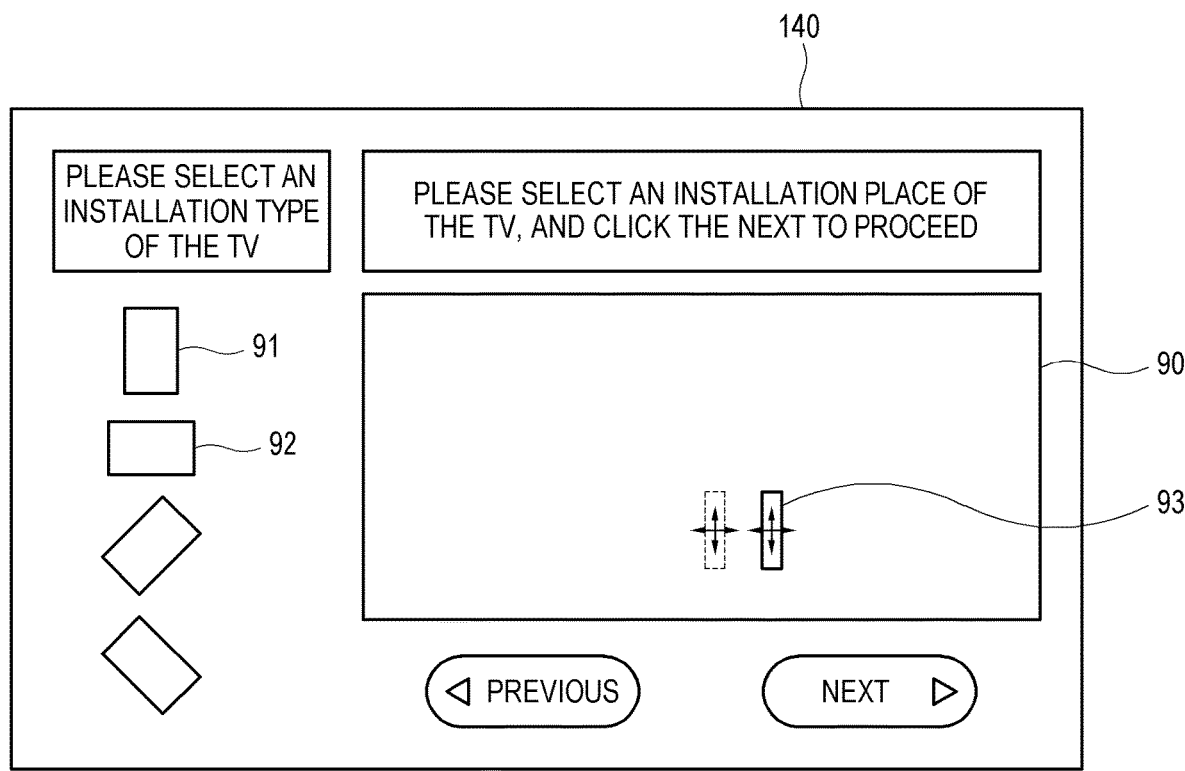
FIGS. 9 to 11 illustrate UIs displayed on a display according to another embodiment of the disclosure.
Figure 10:
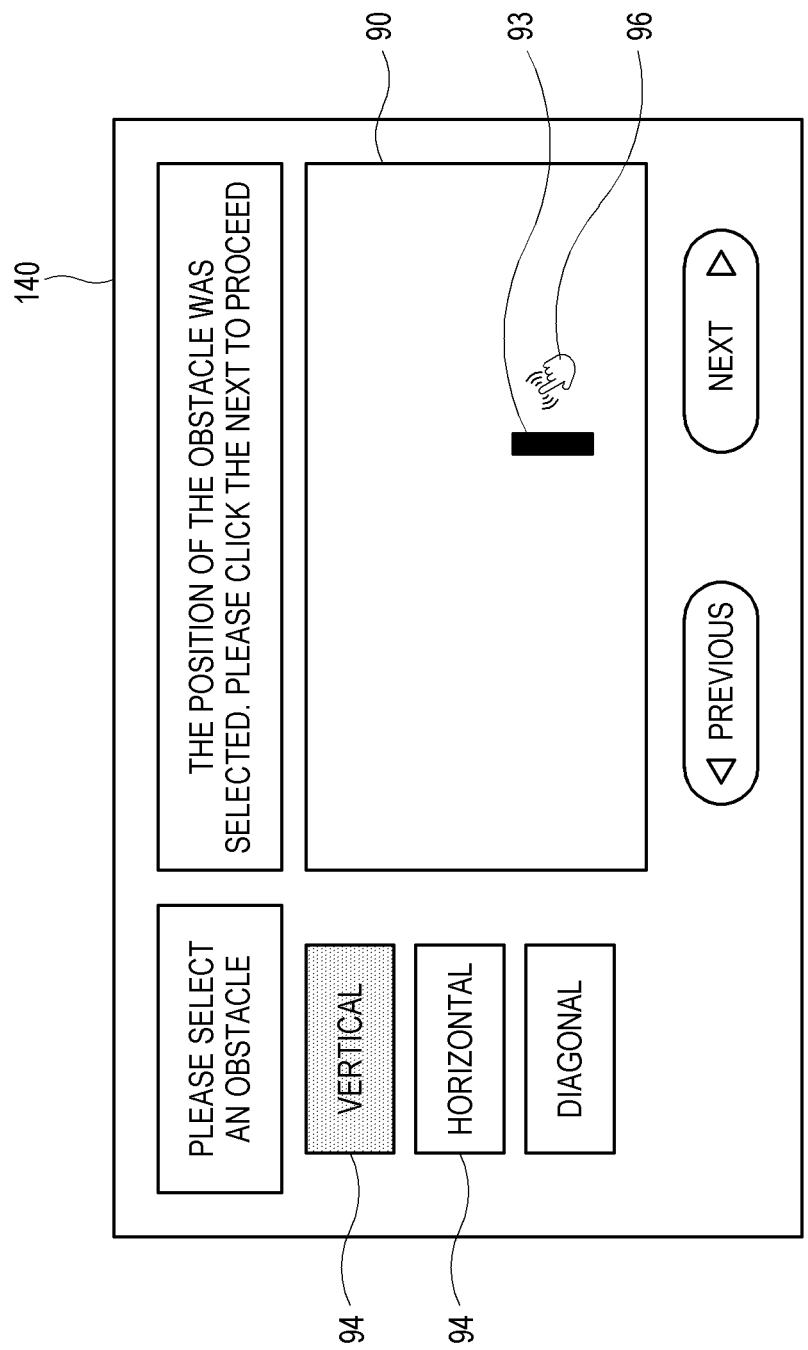
Figure 11:
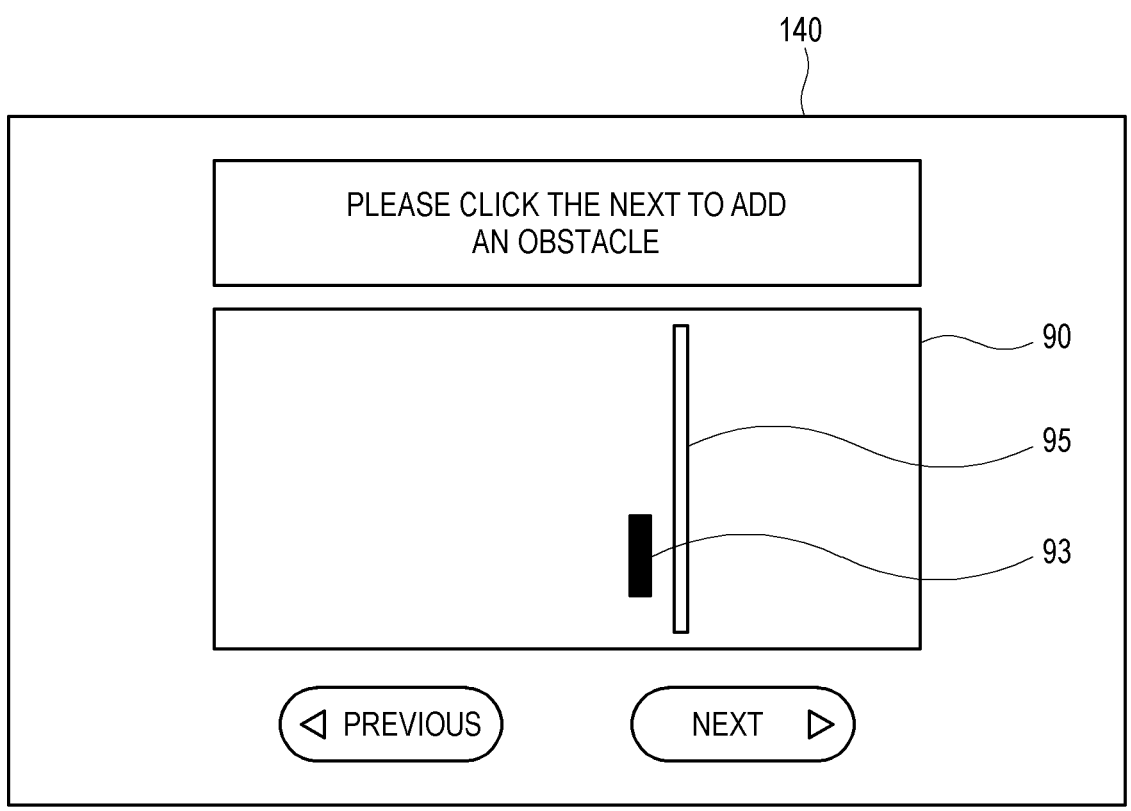

FIGS. 9 to 11 illustrates UIs displayed on a display according to another embodiment of the disclosure. The UIs illustrated in FIGS. 9 to 11 may be displayed on the display 140 as a program (e.g. an setup wizard) is executed to start setting the wireless communication of the display apparatus 100 in the foregoing operation 501.

As shown in FIGS. 9 to 11, the display 140 may display a map 90 showing an installation space for the display apparatus 100, i.e. the TV.

Referring to FIG. 9, a plurality of menu items 91 and 92 for selecting the installation type of the display apparatus 100, i.e. the TV may be displayed as a UI on the display 140, and a user may select a certain item 91 which is the most similar to the actual installation type of the TV.

The processor 170 displays an icon 93 of the display apparatus on the map 90 based on the selected item 91. A user may move the icon 93 to a desired place (an area where the TV is actually installed) on the map 90 in such a manner of dragging the icon 93 of the display apparatus through an input device such as a remote controller provided as the user input receiver 150.

As shown in FIG. 10, the display 140 may display the map corresponding to the installation space of the display apparatus 100, and a plurality of menu items 94 and 95 corresponding to a plurality of candidate obstacles. Here, the plurality of candidate obstacles may be displayed in various forms without being limited to the form shown in FIG. 10.

A user may select one item 94 corresponding to the actual obstacle among a plurality of menu items 94 and 95, and select a position 96 of the obstacle corresponding to the selected item on the map 90 through the input device such as the remote controller provided as the user input receiver 150.

The processor 170 may move and place the item 95 selected among the menu items 94 and 95 on the map 90 based on a user's input as described above. Here, a user's input may include a dragging input with regard to the selected item 95.

The processor 170 may identify the presence of the obstacle around the display apparatus 100 in the foregoing operation 503 based on a user's input of selecting the shape and position of the obstacle in FIG. 10.

As described with reference to FIGS. 9 and 10, when the positions of the display apparatus and the obstacle are selected, the display 140 displays a display apparatus icon 92 and an obstacle icon 97 on the map 90 based on the selected positions as shown in FIG. 11. Here, a user may adjust the size of the obstacle icon 97 through the input device such as the remote controller provided as the user input receiver 150.

In the foregoing embodiments, the presence or material of the obstacle is selected based on a user's input to the UI displayed on the display 140 by way of example. Alternatively, the presence or material of the obstacle may be automatically selected in the display apparatus 100 according to the disclosure.

According to an embodiment, the processor 170 may identify the presence of the obstacle from an image obtained by capturing the surroundings of the display apparatus 100, or may identify the material of the obstacle. Here, the image obtained by capturing the surroundings of the display apparatus 100 is included in information related to the material of the obstacle positioned around the display apparatus 100, which is received in the operation 505 of FIG. 5. Therefore, the material of the obstacle is easily identified by an external device with a camera.

Figure 12:
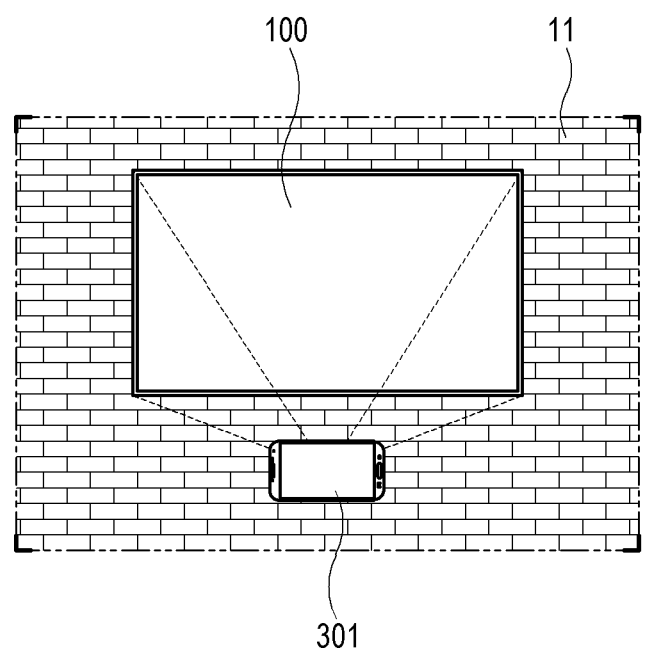
FIG. 12 illustrates an example of capturing an image of surroundings of a display apparatus according to an embodiment of the disclosure.

FIG. 12 illustrates an example of capturing an image of surroundings of a display apparatus according to an embodiment of the disclosure As shown in FIG. 12, a user may employ a smartphone 301 or the like external device having a camera to capture the surroundings of the display apparatus 10. The smartphone 301 may be included in the device 300 targeted for control in FIGS. 1 to 3.

The processor 170 may extract the area of the display apparatus 100 from the captured image, and identify the presence of the obstacle based on the image of the surroundings.

In the case shown in FIG. 12, the processor 170 may identify presence of a wall or the like obstacle in surroundings, based on a surrounding image of the area of the display apparatus 100.

Further, the image obtained by capturing the display apparatus 100 is included in the information related to the material of the obstacle positioned around the display apparatus 100 received in the operation 505 of FIG. 5, and thus the processor 170 identifies the material of the surrounding obstacle based on the surrounding image of the area of the display apparatus 100. For example, when a brick pattern is detected in the surrounding image as shown in FIG. 12, the processor 170 may identify that the material of the obstacle is brick. Alternatively, the processor 180 may identify that the material of the obstacle is wood when a wood pattern is detected in the captured surrounding image, or identify that the material of the obstacle is glass when a light reflection pattern is detected in the captured surrounding image.

According to an embodiment, when it is difficult to identify the material of the obstacle through the captured image, the most typically used material, e.g. concrete may be identified as the material of the obstacle by the processor 180.

According to another embodiment, the display apparatus 100 may identify the installation type, i.e. the wall-hanging type or the standing type based on detection results of the sensor unit 180, and thus identify the presence of the obstacle based on the identified installation type. That is, the obstacle may be detected by a simple method of using the sensor or the like sensor unit provided in the display apparatus.

Figure 13:
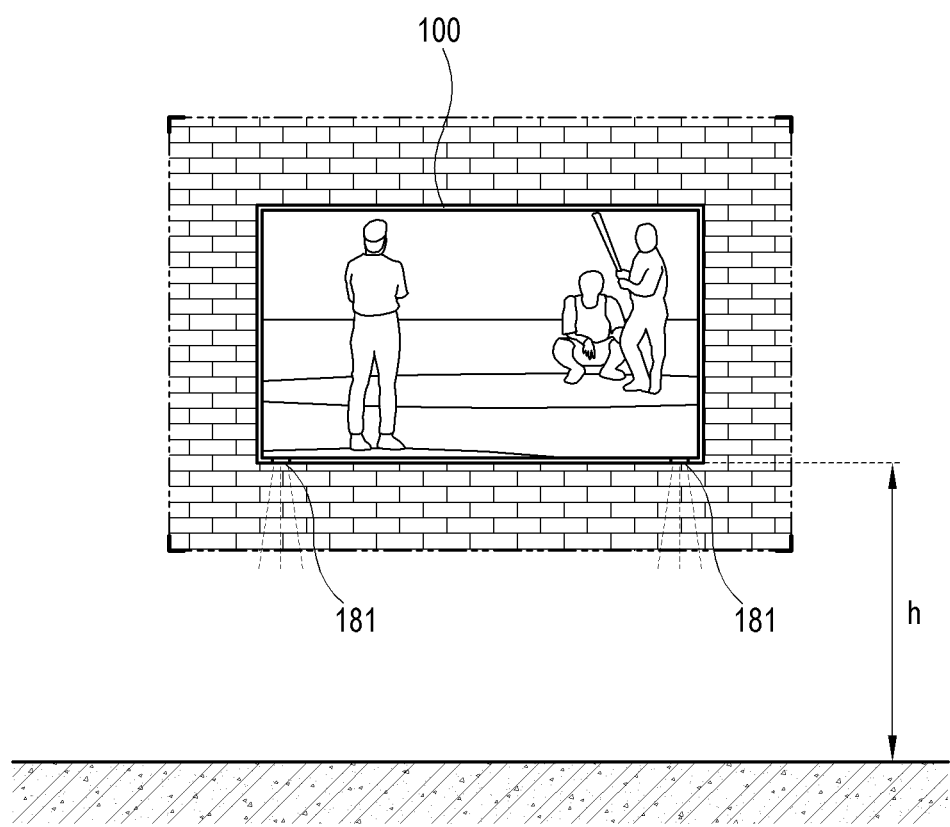
FIG. 13 illustrates a display apparatus using a sensor to identify presence of an obstacle according to an embodiment of the disclosure.
Figure 14:
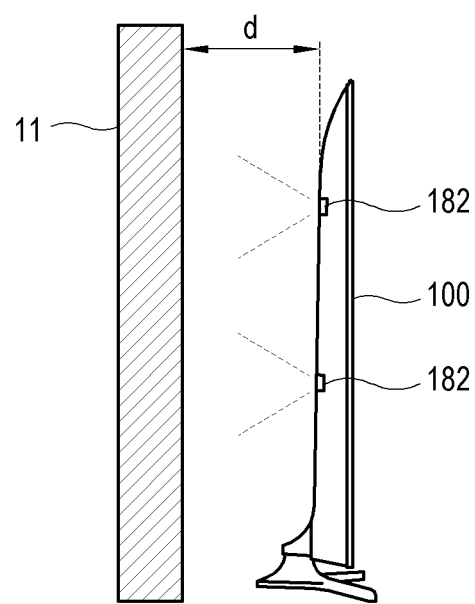
FIG. 14 illustrates a display apparatus using a sensor to identify presence of an obstacle according to another embodiment of the disclosure.

FIG. 13 illustrates a display apparatus using a sensor to identify presence of an obstacle according to an embodiment of the disclosure, and FIG. 14 illustrates a display apparatus using a sensor to identify presence of an obstacle according to another embodiment of the disclosure.

As shown in FIG. 13, the display apparatus 100 may identify whether the installation is a wall-hanging type and a standing type based on a signal sensed by at least one sensor 181 installed facing downward. The sensor 181 may for example be disposed downward from a panel edge of the display 140.

The sensor 181 may include at least one among an ultrasonic sensor, an infrared sensor, and an illuminance sensor.

When the sensor 181 is the ultrasonic sensor or the infrared sensor, the processor 170 may identify a distance from the floor, i.e. an installation height h based on difference between time when then sensor 181 emits a signal and time when feedback on the emitted signal is received. For example, when the distance h from the floor is greater than or equal to a certain distance (i.e., 70 cm), the processor 170 identifies that the installation type of the display apparatus 100 is the wall-hanging type.

When the sensor 181 is the illuminance sensor and the illuminance under the display apparatus 100 is very low, e.g. not greater than a predetermined setting value, the processor 170 may identify that the installation type of the display apparatus 100 is the standing type.

As shown in FIG. 14, the display apparatus 100 may identify which of the wall-hanging type and the standing type its installation type corresponds to, based on a signal sensed by at least one sensor 182 installed facing backward. The sensor 182 may for example be disposed backward from the back of the display apparatus 100.

The sensor 182 may include at least one among an ultrasonic sensor, an infrared sensor, and an illuminance sensor.

When the sensor 182 is the ultrasonic sensor or the infrared sensor, the processor 170 may identify a distance d from a backward obstacle, i.e. the wall 11 based on difference between time when then sensor 182 emits a signal and time when feedback on the emitted signal is received.

The processor 170 identifies that the installation type of the display apparatus 100 is the wall-hanging type when the obstacle 11 is within a predetermined distance from the back of the display apparatus 100, based on the identified distance d. Further, the processor 170 identifies that the installation type of the display apparatus 100 is the standing type when the obstacle 11 is positioned at a predetermined distance or more from the back of the display apparatus 100 as shown in FIG. 14, based on the identified distance d.

When the sensor 182 is the illuminance sensor and the illuminance at the back of the display apparatus 100 is very low, e.g. not greater than a predetermined setting value, the processor 170 may identify that the installation type of the display apparatus 100 is the wall-hanging type.

According to another embodiment, the display apparatus 100 may be configured to identify the material of the obstacle based on the information input when installed for the first time.

Various pieces of information are input while the TV or the like display apparatus 100 is set as installed for the first time. For example, a user's address may be input as information about an installation place.

The processor 180 may identify the material of the obstacle such as the wall 11 corresponding a universal housing style of the user's input address by comparing the address with a database provided in a server or the like. For example, when a user's address corresponds to an area in which apartments are concentrated, the material of the obstacle may be identified as concrete.

According to various above embodiments of the disclosure, the display apparatus 100 of the disclosure identifies the material of the obstacle by receiving information related to the obstacle when the obstacle 10 such as the wall 11 is present in the surroundings of the display apparatus 100, and controls the communicator 120 so that the strength of the transmission signal for the wireless communication can be adjusted according to the materials of the obstacle. Here, the processor 170 adjusts the strength of the transmission signal based on the dielectric constant according to the identified material of the obstacle. Specifically, the processor 170 performs control to amplify the transmission signal to be larger as the obstacle has a higher dielectric constant.

Figure 15:
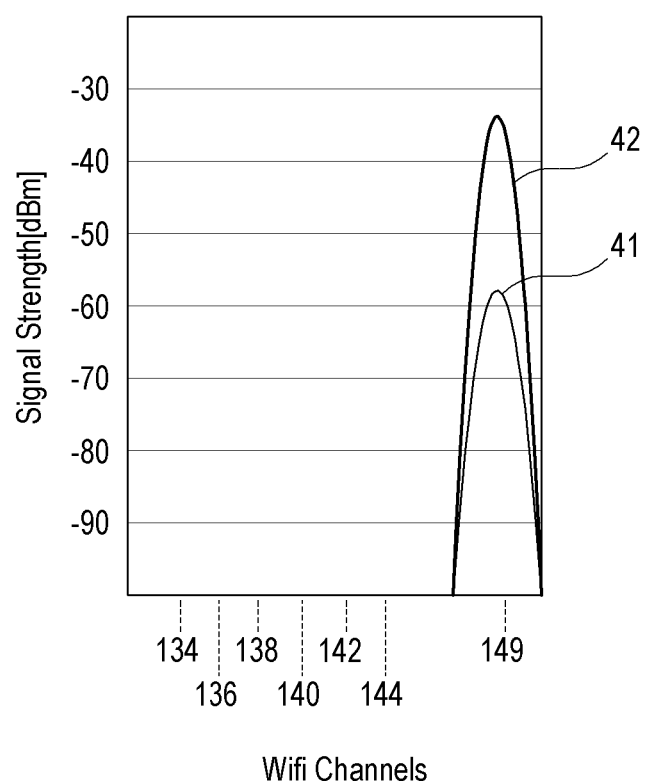
FIG. 15 illustrates a display apparatus that adjusts strength of a transmission signal for wireless communication according to an embodiment of the disclosure.

FIG. 15 illustrates a display apparatus that adjusts strength of a transmission signal for wireless communication according to an embodiment of the disclosure.

When an obstacle is present around the display apparatus 100 as shown in FIG. 15, the transmission signal has a strength 42 amplified by the communicator 120 as compared with a conventional strength 41.

According to an embodiment of the disclosure, the amplified strength 42 of the transmission signal is identified in consideration of the dielectric constant according to the material of the obstacle, and therefore the wireless communication is seamlessly and stably performed even though an obstacle made of a specific material is present around the display apparatus 100.

As described above, in a display apparatus and a method of controlling the same according to the disclosure, when an obstacle is present around the display apparatus, strength of a transmission signal for wireless communication is adjusted according to the material of the obstacle, so that the wireless communication can be stably performed regardless of the surrounding obstacle.

Further, according to the disclosure, a UI for allowing a user to make selection is provided, and presence of an obstacle or the material of the obstacle is identified based on a user's input to the provided UI. Thus, it is convenient for a user to set the wireless communication by easy control according to an installation condition, Further, according to the disclosure, a capture image obtained by an external device, or a sensor provided in the display apparatus is used to automatically identify the presence of the obstacle or the material of the obstacle.

Although certain embodiments have been shown and described, it will be appreciated by those skilled in the art that changes may be made in these embodiments without departing from the principles and spirit of the disclosure, the scope of which is defined in the appended claims and their equivalents.

What is claimed is:

1. A display apparatus comprising:
   a display;
   a communication circuit configured to perform wireless communication with at least one device external to the display apparatus; and
   a processor configured to:
      control the display to display a user interface (UI) on the display,
      control the display to display a map showing an installation space of the display apparatus, and a plurality of menu items including a plurality of candidate obstacles,
      control the display to move and place at least one of the plurality of menu items on the map based on a user's input, a first item among the at least one of the plurality of menu items depicting the display apparatus, and a second item among the at least one of the plurality of menu items depicting an obstacle from the plurality of candidate obstacles,
      identify a material of an obstacle present in a vicinity of the display apparatus by obtaining information about the material of the obstacle based on the user's input on the map on the displayed UI, and
      control the communication circuit to transmit a transmission signal for the wireless communication based on the identified material of the obstacle.

2. The display apparatus according to claim 1, wherein the processor is further configured to control the display to display a plurality of candidate obstacles to be selectable on the UI, each of the plurality of candidate obstacles being made of a different material having a corresponding dielectric constant.

3. The display apparatus according to claim 1, wherein the information about the material of the obstacle present in the vicinity of the display apparatus further comprises an image obtained by capturing surroundings of the display apparatus.

4. The display apparatus according to claim 3, wherein the captured image is obtained from another device external to the display apparatus.

5. The display apparatus according to claim 1, further comprising at least one sensor,
   wherein the processor is further configured to identify whether the obstacle is present in the vicinity of the display apparatus, based on a signal sensed by the at least one sensor.

6. The display apparatus according to claim 5, wherein the processor is further configured to identify the presence of the obstacle, based on whether the obstacle is present within a predetermined distance from a back side of the display apparatus.

7. The display apparatus according to claim 5, wherein the at least one sensor is disposed facing downward from an edge of the display.

8. The display apparatus according to claim 1, further comprising a storage configured to store a setting value of a plurality of transmission signals, each of the plurality of transmission signals corresponding to one of a plurality of candidate obstacles, each of the plurality of candidate obstacles being made of a different material having a corresponding dielectric constant, and
   wherein the processor is further configured to read the setting value corresponding to the identified material of the obstacle, and control the communication circuit to transmit the transmission signal for the wireless communication based on the setting value.

9. The display apparatus according to claim 1, wherein the processor is further configured to control the communication circuit to adjust a strength value of the transmission signal for the wireless communication based on the identified material of the obstacle.

10. A method of controlling a display apparatus, comprising:
    controlling a display of the display apparatus to display a user interface (UI) on the display;
    controlling the display to display a map showing an installation space of the display apparatus, and a plurality of menu items including a plurality of candidate obstacles;
    controlling the display to move and place at least one of the plurality of menu items on the map based on a user's input, a first item among the at least one of the plurality of menu items depicting the display apparatus, and a second item among the at least one of the plurality of menu items depicting an obstacle from the plurality of candidate obstacles;
    identifying a material of an obstacle present in a vicinity of the display apparatus by obtaining information about the material of the obstacle based on the user's input on the map on the displayed UI; and
    transmitting a transmission signal for wireless communication with at least one device external to the display apparatus based on the identified material of the obstacle.

11. The method according to claim 10, further comprising displaying a plurality of candidate obstacles, each of the plurality of candidate obstacles being made of a different material having a corresponding dielectric constant.

12. The method according to claim 10, further comprising identifying whether an obstacle is present in the vicinity of the display apparatus, based on a signal sensed by at least one sensor provided in the display apparatus.

13. The method according to claim 12, further comprising identifying the presence of the obstacle, based on whether the obstacle is present within a predetermined distance from a back or bottom of the display apparatus.

14. The method according to claim 10, further comprising:
    reading a setting value corresponding to the identified material of the obstacle from a storage configured to store the setting value of a plurality of transmission signals, each of the plurality of transmission signals corresponding to one of a plurality of candidate obstacles, each of the plurality of candidate obstacles being made of a different material having a corresponding dielectric constant; and
    transmitting the transmission signal for the wireless communication based on the setting value.

15. The method according to claim 10, further comprises adjusting a strength value of the transmission signal for the wireless communication based on the identified material of the obstacle.

16. A non-transitory computer-readable nonvolatile recording medium recorded with a program of a method executable by a processor of a display apparatus, the method comprising:
    controlling a display of the display apparatus to display a user interface (UI) on the display;
    controlling the display to display a map showing an installation space of the display apparatus, and a plurality of menu items including a plurality of candidate obstacles;

controlling the display to move and place at least one of the plurality of menu items on the map based on a user's input, a first item among the at least one of the plurality of menu items depicting the display apparatus, and a second item among the at least one of the plurality of menu items depicting an obstacle from the plurality of candidate obstacles;

identifying a material of an obstacle present in a vicinity of the display apparatus by obtaining information about the material of the obstacle based on the user's input on the map on the displayed UI; and transmitting a transmission signal for wireless communication with at least one device external to the display apparatus based on the identified material of the obstacle.

* * * * *